(12) United States Patent
Meekins

(10) Patent No.: US 6,592,073 B1
(45) Date of Patent: Jul. 15, 2003

(54) AMPHIBIOUS AIRCRAFT

(75) Inventor: John A. Meekins, Cobbs Creek, VA (US)

(73) Assignee: Leader Industries, Inc., Norfolk, VA (US)

( * ) Notice: Subject to any disclaimer, the term of this patent is extended or adjusted under 35 U.S.C. 154(b) by 0 days.

(21) Appl. No.: 10/083,081

(22) Filed: Feb. 26, 2002

(51) Int. Cl.⁷ .............................................. B64C 35/00

(52) U.S. Cl. ...................................... 244/105; 244/106

(58) Field of Search ........................ 244/105, 36, 53 R, 244/54, 55, 101, 106, 109, 23 A–23 C, 12.2–12.5; B64C 1/00, 35/00

(56) References Cited

U.S. PATENT DOCUMENTS

| | | | | |
|---|---|---|---|---|
| 1,778,906 A | * | 10/1930 | Monjouste | 244/218 |
| 1,815,341 A | * | 7/1931 | Zaharoff | 244/55 |
| 1,885,392 A | * | 11/1932 | Tuten | 244/101 |
| 1,927,352 A | * | 9/1933 | Tetlow | 244/13 |
| 2,003,975 A | | 6/1935 | Rand, Jr. | |
| D138,102 S | * | 6/1944 | Kelly | D12/335 |
| D144,122 S | * | 3/1946 | Martin | D12/573 |
| D144,936 S | * | 6/1946 | Schued | D12/335 |
| D144,937 S | * | 6/1946 | Schued | D12/335 |
| D144,938 S | * | 6/1946 | Schued | D12/335 |
| 2,557,962 A | * | 6/1951 | Greene | 244/118.2 |
| 2,656,136 A | * | 10/1953 | Martin | 244/106 |
| 2,913,196 A | * | 11/1959 | Cox, Jr. | 244/15 |
| 3,029,042 A | * | 4/1962 | Martin | 244/2 |
| 3,329,376 A | * | 7/1967 | Sullivan | 244/12.4 |
| 3,627,235 A | | 12/1971 | Lippisch | |
| 3,737,121 A | * | 6/1973 | Jones | 244/13 |
| 3,884,432 A | * | 5/1975 | Blanchard et al. | 244/15 |
| 4,579,297 A | | 4/1986 | Ayoola | |
| 4,865,275 A | * | 9/1989 | Thompson | 244/219 |
| 4,899,954 A | * | 2/1990 | Pruszenski, Jr. | 244/2 |
| 5,071,088 A | * | 12/1991 | Betts | 244/12.1 |
| 5,242,132 A | * | 9/1993 | Wukowitz | 244/106 |
| 5,273,238 A | * | 12/1993 | Sato | 244/105 |
| 5,277,383 A | | 1/1994 | Tormakhov et al. | |
| 5,357,894 A | | 10/1994 | Jacobson | |
| 5,415,365 A | | 5/1995 | Ratliff | |
| 5,758,844 A | * | 6/1998 | Cummings | 244/7 C |
| 5,850,990 A | | 12/1998 | Gevers | |
| 6,113,028 A | | 9/2000 | Lohse et al. | |
| 2001/0011691 A1 | * | 8/2001 | Provost | 244/55 |
| 2002/0003190 A1 | * | 1/2002 | Sankrithi et al. | 244/119 |

OTHER PUBLICATIONS

Quad City Ultralight Aircraft Corp. Home of the Challenger http://www.quadcitychallenger.com (Apr. 3, 2002) (pp 1–2).
P–38 Lightning Online "The Fork–Tailed Devil" http://p–38online.com (Apr. 3, 2002) (p. 1).
Seafire TA 16 http://www.seafireta16.com/products.htm (Apr. 3, 2002) (p. 1).
*Happiness is a wet Bottom* Aventura II Amphibian Experimental Homebuilt Aircraft http://members.aol.com/_ht_a/cbrxxdrv?Aventura.html?mtbrand=AOL_US (Apr. 3, 2002) (p. 1).
Cessna.com http://caravanamphib.Cessna.com (Apr. 3, 2002) (p. 1).

(List continued on next page.)

*Primary Examiner*—Charles T. Jordan
*Assistant Examiner*—Stephen A Holzen
(74) *Attorney, Agent, or Firm*—Kilpatrick Stockton LLP

(57) ABSTRACT

General aviation class amphibious aircraft which include two fuselages, each having a hydrodynamic surface, the fuselages connected via a primary flight surface and a ducted power plant located aft and above the fuselages. The power plant location removes the fan/propeller arc from water and spray during water-borne taxiing, takeoff and landing. The combination of fuselages, lifting surface and ducting provides an aerodynamically efficient design with a lower center of gravity and protected powerplant for yielding improved performance including increased range and airspeed, together with favorable maneuverability, stability and control characteristics both aerodynamically and hydrodynamically.

18 Claims, 4 Drawing Sheets

OTHER PUBLICATIONS

Piper–Sterling Amphibian 4 place (Experimental) http://www.aircraftbrowser.com/Piper–Sterling%20Amphibian%204%20place%20(Experimen.. (Mar. 28, 2002) (p. 1).

Coot Amphibian http://coot–a.freeyellow.com (Mar. 28, 2002) (p. 1).

The Glass Goose by Quikkit http://exp–aircraft.com/aircraft/quikkit/quikkit.html (Mar. 28, 2002) (p. 1).

Avid Aircraft, Inc. Catalina http://www.airsport.com/kits/kcatalna.htm (Mar. 28, 2002) (p. 1).

Ultravia Aero, Inc. Pelican Club VS http://www.airsport.com/kits/kpelican.htm (Mar. 28, 2002) (p. 1).

Seastar AAC Amphibian Airplanes of Canada Ltd. http://www.seastaramphibian.com/gallery.htm (Mar. 28, 2002) (p. 1).

SeaStar Amphibious Airplane http://www.seastarplane.com (Mar. 28, 2002) (p. 1).

Seawind The World's Fastest and Best Amphibian http://www.seawindsna.com (Mar. 6, 2002) (p. 1).

Centaur Fly the Wave http://www.centaurseaplane.com/docs/home/htm (Mar. 18, 2002) (p. 1).

Lake http://www.amphib.com/citylk.htm (Mar. 28, 2002) (p. 1).

Kenmore Air—Seaplanes http://www.kenmoreair.com/seaplanes.html (Mar. 28, 2002) (p. 2).

Seattle Seaplanes Flight Instruction http://www.seattleseaplanes.com/pages/Instruction.html (Mar. 28. 2002) (p. 1).

Osprey II Amphibian Info http://www.ospreycraft.com/prod02.htm (Mar. 28, 2002) (p. 1).

Seafire TA 16 http://www/seafireta16.com (Mar. 28, 2002) (p. 1).

Oshkosh 2001 http://www.therispins.com/pictures_from_Oshkosh_2001.htm (Mar. 28, 2002) (p. 2).

http://www.zenithair.com/zodiac/xl/bldrpics/amph6.jpg (Mar. 28, 2002) (p. 1).

*Seaplanes of the World A Timeless Collection from Aviation's Golden Age* Bill Yenne with illustrations by John Batchelor (Published by Barnes & Noble by arrangement with O.G. Publishing, Inc. 2000) (pp. 1–176).

F82G Twin Mustang 1/32 Model (twin fuselage P51) http://www.historicaviation,.com/product_info.po;jsessionid=1NDInHje8IVsQWXimXRix(.. (Jun. 27, 2002) (p. 1).

P–61 Black Widow http://www.maam.org/p61art/p61art1.html (Jun. 27, 2002) (pp. 1–2).

Fairchild C119 http:/www.oldprops.f9.co.uk/C119.htm (Jun. 27, 2002) (pp. 1–4).

B26 Marauder http://b26marauder.com (Jun. 27, 2002) (pp. 1–2).

* cited by examiner

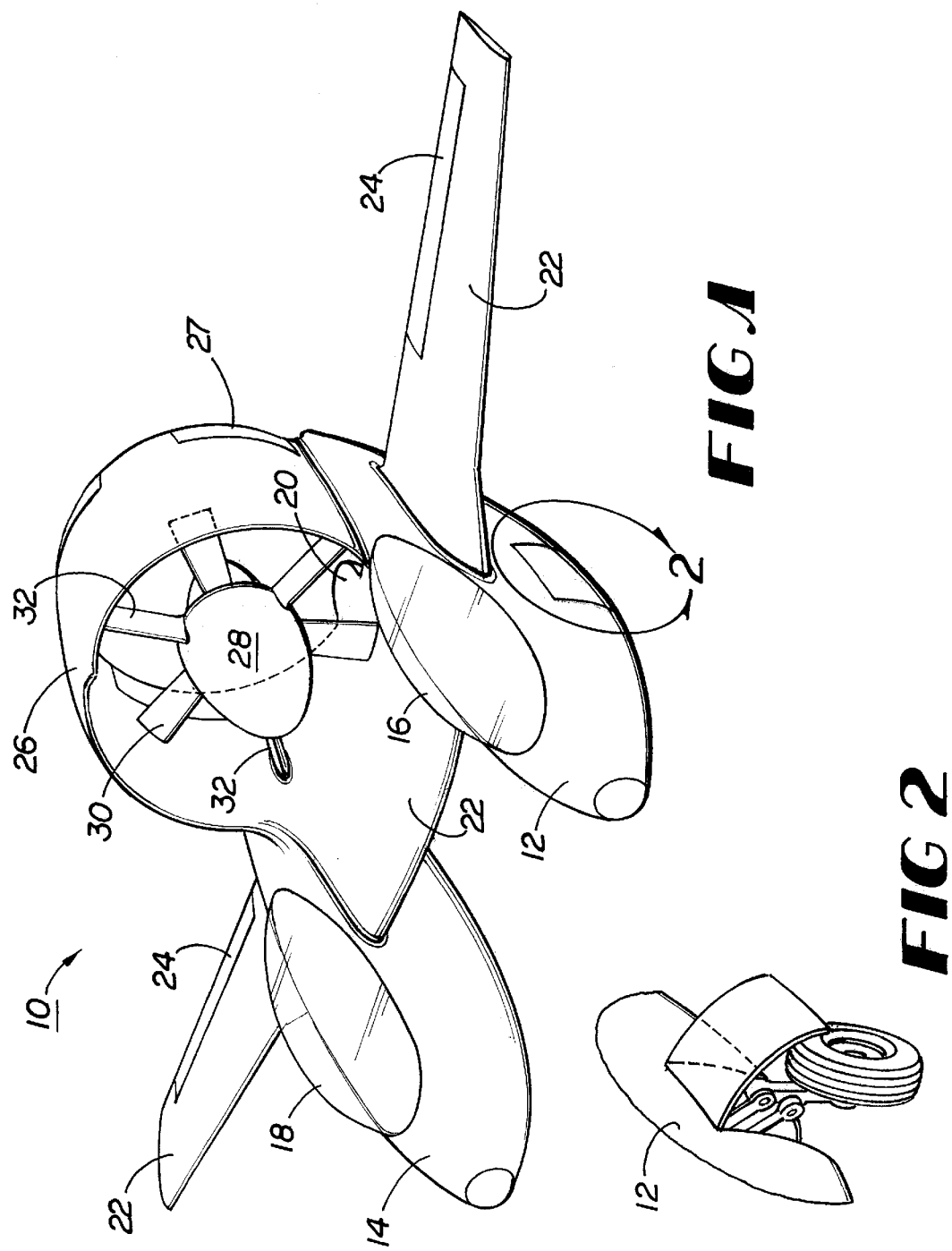

AMPHIBIOUS AIRCRAFT

BRIEF DESCRIPTION

Aircraft which can take off and land on the water have populated the skies for many years, since the dawn of powered aviation. Such aircraft have been considered seaplanes if unable also to take off and land on the ground, and amphibious if able to take off and land both on the ground and water. For purposes of this document, seaplanes are included in and considered a subcategory of amphibious aircraft, as amphibious aircraft which do not feature or have not been fitted with the sort of landing gear which allows takeoff and landing on the ground.

Amphibious aircraft have typically been of two general types. The first general type includes single fuselage designs in which the fuselage serves as flotation and usually includes appropriate hydrodynamic contouring. A prime example is the PBY Catalina multiengine aircraft in wide use in the mid-20$^{th}$ century. The second general type also has a single fuselage, but the fuselage is supported on floats or pontoons. Examples include any number of conventional aircraft which have been fitted with floats.

The single fuselage/hull amphibious aircraft have generally taken the form of larger, high-winged, multi-engine designs in an effort to position engine intakes and propeller arcs above water and spray. Lake Aircraft models, however, feature a single fuselage/hull design with high wing and a powerplant mounted on a strut above the fuselage. Other float design general aviation class aircraft avoid the spray issue by dimensioning the float struts of sufficient length to raise the fuselage and propeller arc of the typically forward-mounted engine above water line, spray being less of an issue since the engine is forward of the floats.

A significant issue with conventional float designs is the considerable additional aerodynamic drag created by the floats. That drag not only reduces range and airspeed, but it also creates additional moments of inertia about all of the yaw, pitch, and roll axes of the aircraft, and can thus degrade maneuverability of the aircraft. For smaller aircraft, the inventor has found that the designs featuring powerplants mounted too great a distance above the fuselage introduce stability issues, particularly on the water as well as in situations requiring radical power changes, as well as maneuverability issues which may arise as a result of the thrust axis being located an excessive distance above the center of gravity.

Twin fuselage aircraft have also been designed and used for various purposes, including the P38 Lightening, the P51 Mustang twin fuselage version and the B26 bomber designs widely used in World War II. Those designs typically offer an additional site at the forward end of a fuselage for a power plant and/or armament, together with additional stability at least about the roll axis. Similar designs include the single cockpit/twin tailboom aircraft such as the P61 Black Widow and the C119 Flying Boxcar.

One aspect of certain embodiments according to the present invention is to provide general aviation class amphibious aircraft which avoid any or all of aerodynamic drag and concomitant issues presented by pontoons and floats as well as structural, control and maneuverability issues presented by fuselage supported high engine designs, and which leverage the advantages of a twin fuselage, twin hull design in which the power plant is located aft and positioned advantageously with respect to water and spray.

Another aspect of certain embodiments according to the present invention is to provide amphibious aircraft in the general aviation class with any or all of increased range, speed and maneuverability, among other advantages, relative to conventional smaller float amphibious aircraft.

Another aspect of certain embodiments according to the present invention is to provide amphibious aircraft in the general aviation class which are eminently stable during take off, landing and taxiing phases on the water.

Other objects, features and advantages of the invention and embodiments thereof will become apparent with respect to the remainder of this document.

BRIEF DESCRIPTION OF THE DRAWINGS

FIG. 1 is a perspective view of a first embodiment of an amphibious aircraft according to the present invention.

FIG. 2 is a view of a portion of the embodiment of FIG. 1.

DETAILED DESCRIPTION

Figure 3:
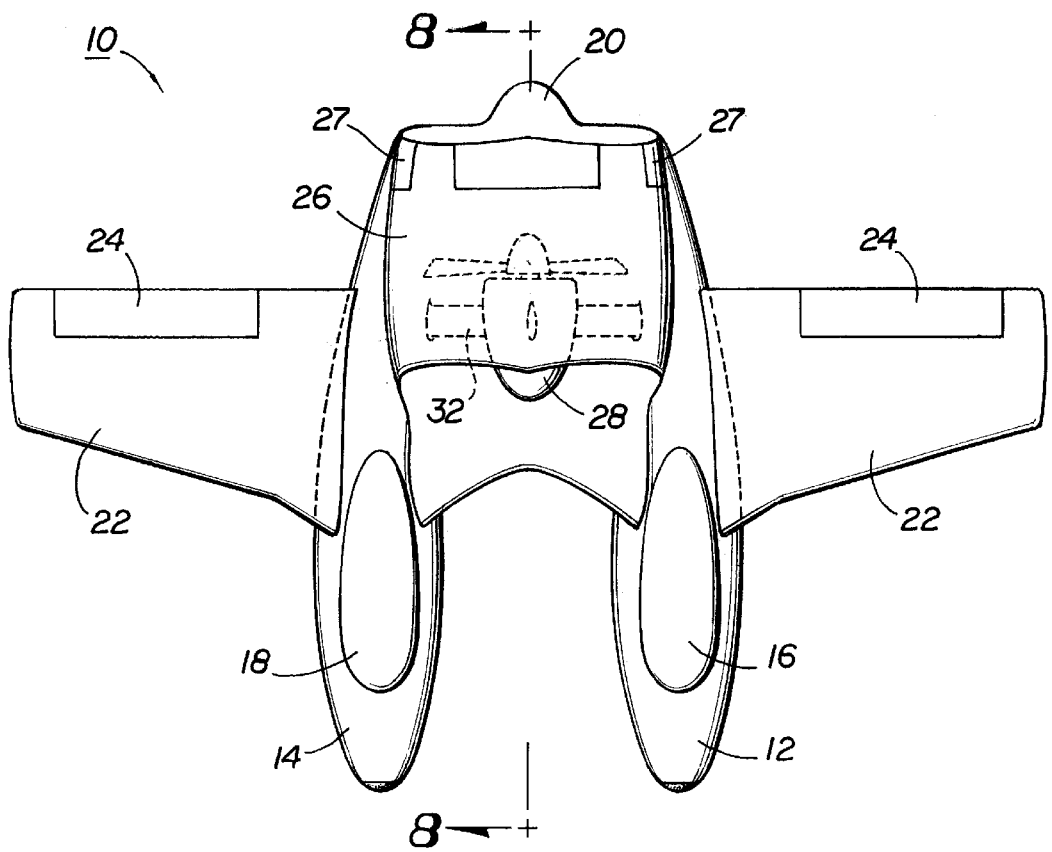
FIG. 3 is a top plan view of the embodiment of FIG. 1.
Figure 4:
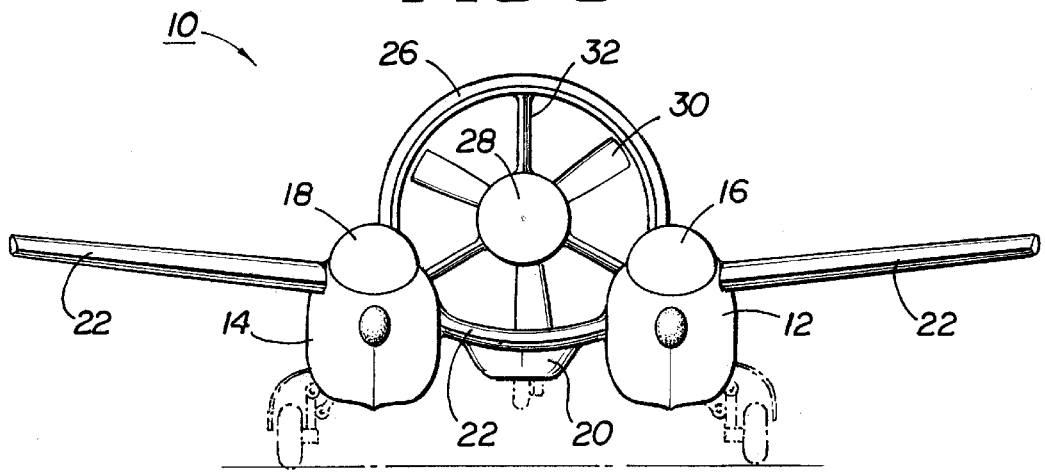
FIG. 4 is a front elevational view of the embodiment of FIG. 1.

FIGS. 1–8 all show a preferred embodiment of an amphibious aircraft according to a preferred embodiment of the present invention. This embodiment features a twin fuselage, twin hull design with aft mounted, ducted propeller power plant. The first and second fuselages, 12 and 14 respectively, can each contain any or all of pilot/co-pilot/passenger accommodations. Pilot and copilot flight controls may be located in any number of permutations. For example, the port cockpit 16 might contain primary flight controls for the pilot in command and the starboard cockpit controls for a co-pilot. This configuration could be reversed, no co-pilot controls need be included, or both of pilot and co-pilot controls could be placed in either of cockpits 16 or 18 with additional passenger space in either or both of those cockpits as desired.

Each fuselage 10, 12 is preferably faired and configured for appropriate hydrodynamic effects, both statically and dynamically during all phases of taxing, takeoff and landing. The fuselages may feature any desired shape, length, width and height to accomplish the result of appropriate aerodynamic and hydrodynamic performance for a general aviation class amphibious aircraft with favorable stability, airspeed, range, and maneuverability characteristics. An aft hydrodynamic stabilizer 20 may be included as shown in these figures. The stabilizer generally affects performance during taxing, takeoff and landing on the water. Retractable or non-retractable landing gear 21 may also be included.

Primary lifting surface 22 of this particular embodiment is a generally cantilevered, preferably positive dihedral design with a significant aerodynamically active portion located between the fuselages 12 and 14. The lifting surface 22 might be of any desired structural design, swept or unswept, any desired combination of camber, chord, airfoil, aspect ratio and any length and structural configuration. Short Takeoff/Landing or other variable lift/wing performance structures may be chosen as appropriate and can include configurable surfaces such as slats and/or flaps in addition to flight control surfaces such as ailerons, flaps, combination flaps/ailerons, elevators, combination ailerons and elevators, trim tabs and other appropriate surfaces. Any and/or all of these surfaces may be manually controlled, computer controlled, or a combination of the two. In addition to primary lifting surface 22, canards (not shown) can be employed. Additionally, surfaces on the fuselages and the ducting described hereafter can contribute to the lift produced by the aerodynamic structure of aircraft 10.

Figure 5:
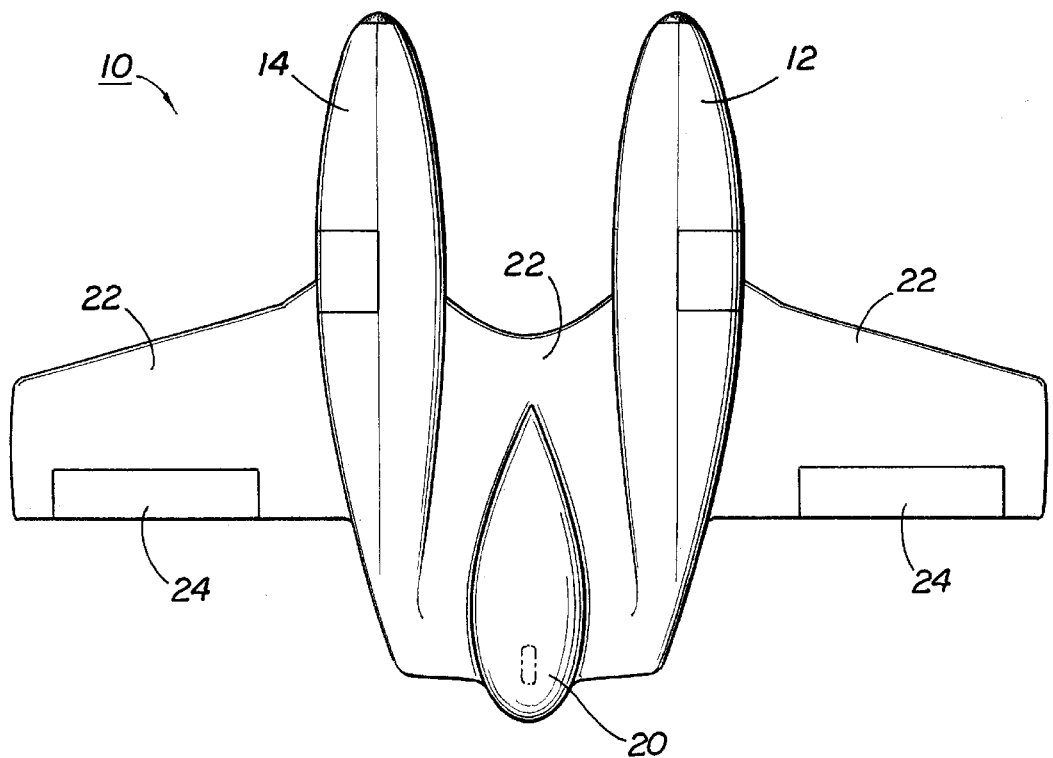
FIG. 5 is a bottom plan view of the embodiment of FIG. 1.
Figure 6:
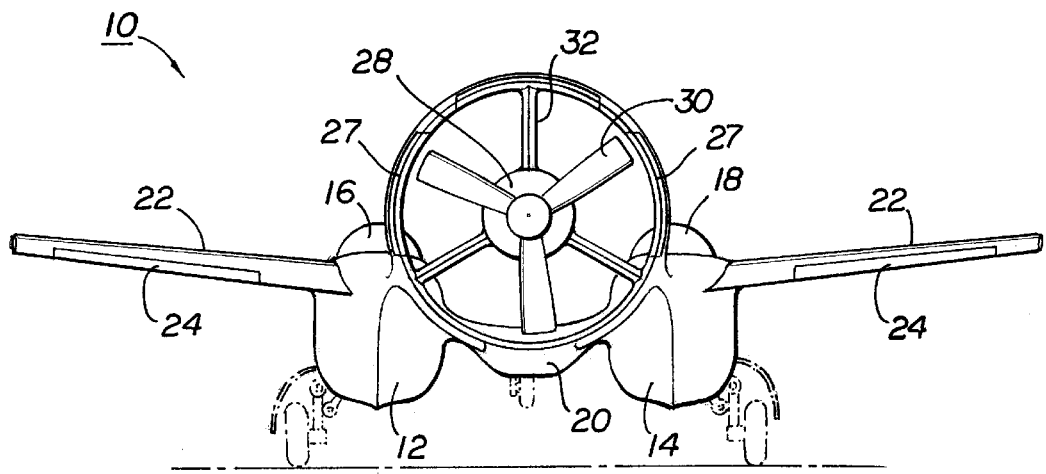
FIG. 6 is a rear elevational view of the embodiment of FIG. 1.
Figure 7:
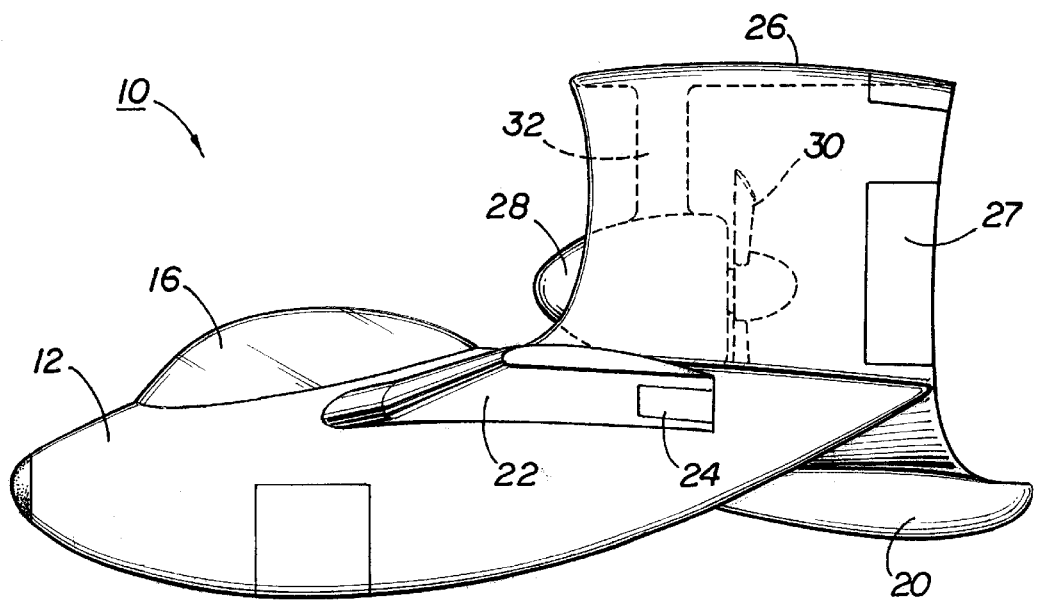
FIG. 7 is a cross sectional view of the embodiment of FIG. 1.
Figure 8:
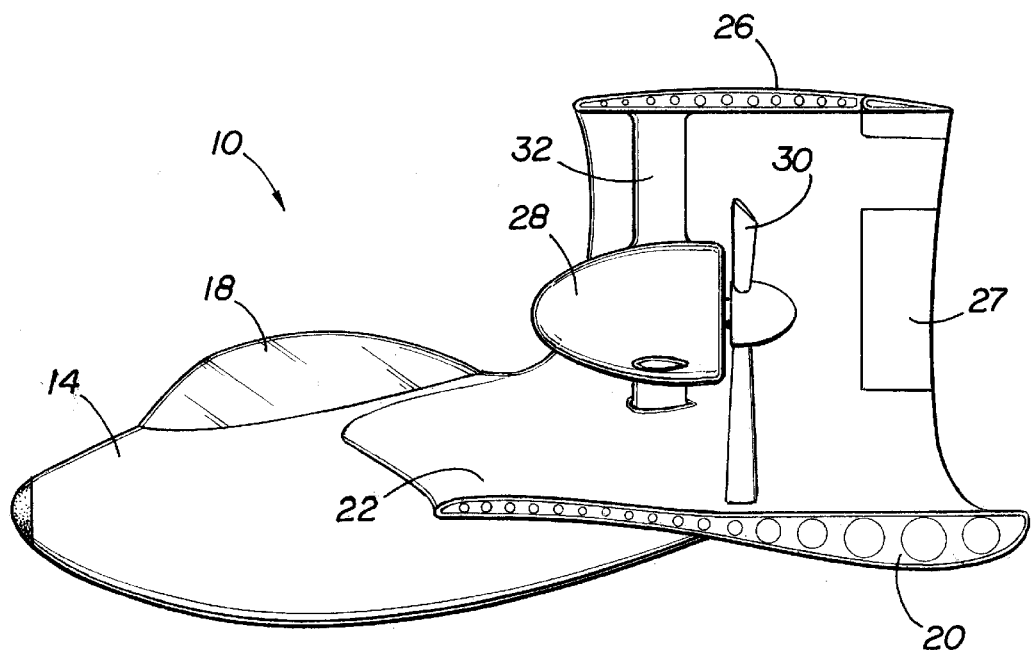
FIG. 8 is another cross sectional view of the embodiment of FIG. 1.

Flight control surfaces in the forms of combination flaps/ailerons 24 are shown in FIGS. 1, 3 and 5.

The power plant in the particular embodiment shown in FIGS. 1–8 is a reciprocating propeller/fan design surrounded by duct 26. Duct 26 may provide lift and may contain elevators and/or rudder flight control surfaces, together with other flight control surfaces as desired. The power plant 28 may be of any desired manufacture or design, including reciprocating or jet. The fan or propeller may be constant speed or variable speed, controllable pitch or otherwise. One particular form of ducted powerplant design which is appropriate is a fanjet or jet engine with high bypass ratio, which may be used with or without other ducting structure 26 of the sort shown in the drawings; in that the cowling around the fan serves as the duct.

Power plant 28 and prop/fan 30 may be supported within duct 26 by appropriate structure such as web 32 extending from both fuselages 12, 14, and assisting in support of duct 26.

Fuel tanks may be located within fuselages 12, 14, lifting surface 22 or duct 26 or a combination, appropriate weight and balance, maneuverability and fuel flow issues taken into account.

Any or all components including structural components and surfaces of embodiments according to the present invention may be formed of conventional materials including metallic materials and/or composites, preferably with appropriate corrosion-resistant characteristics for operation in salt water aggressive environments.

The fuselages 12, 14 may be positioned relative to each other at sufficient distance for optimum maneuverability and control, together with appropriate performance on the water and structural integrity. The fuselages 12, 14 preferably act in combination with the lifting surface 22 and the ducting 26 to provide favorable aerodynamic performance with or without power applied, thus providing smooth transition into an engine out mode, and smooth performance as power is applied such as for takeoff.

The low center of gravity together with the positioning of the ducted prop/fan power plant, in combination with lifting surface 22 interposed between the fuselages 12, 14 allows any or all of at least these advantages:

(1) substantially removing the power plant 28 and the prop/fan 30 from water and spray;

(2) improved hydrodynamic performance combined with aerodynamic performance relative to conventional float/pontoon designs;

(3) favorable stability and maneuverability on the water, and stable control in landing and takeoff modes whether on the water or on the ground.

(4) improved speed and range relative to comparably sized and power amphibious aircraft;

(5) favorable comfort and visibility for operators and passengers, due in part to cockpits placed well forward of the power plant.

What is claimed:

1. A general aviation class amphibious aircraft adapted to take off and land on water, comprising:
   (a) a pair of fuselages joined by a cantilevered lifting surface, each fuselage containing a cockpit and hydrodynamic fairing;
   (b) a power plant mounted on a web supported by each of the fuselages, the power plant located adjacent to portions of the fuselages and connected to at least one of a propeller or fan;
   (c) a duct surrounding the power plant and connected to the fuselages for improving efficiency of the powerplant and providing lift.

2. An aircraft according to claim 1 in which the lifting surface includes elevators and aileron surfaces and the duct includes rudder surfaces.

3. An aircraft according to claim 1 in which one cockpit contains primary flight controls and the other cockpit contains secondary flight controls.

4. An aircraft according to claim 1 in which the lifting surface contains combination flap and aileron flight surfaces.

5. An aircraft according to claim 1 in which the duct contains elevator and rudder flight control surfaces.

6. An aircraft according to claim 1 in which the duct includes flight surfaces which perform a combination of elevator and rudder functions.

7. An aircraft according to claim 1 in which the power plant is reciprocating.

8. An aircraft according to claim 1 in which the power plant includes a turbojet.

9. An aircraft according to claim 1 in which all external surfaces are formed of composites.

10. A general aviation class aircraft adapted to land and take off on water, comprising:
    (a) a pair of fuselages joined by a cantilevered lifting surface, each fuselage containing a cockpit and hydrodynamic fairing, each fuselage adapted at least partially to float the aircraft on water in order to allow take off, taxiing and landing operations;
    (b) a power plant mounted on a web supported by each of the fuselages, the power plant located adjacent to portions of the fuselages and connected to at least one of a propeller or fan;
    (c) a duct surrounding the power plant and connected to the fuselages for improving efficiency of the powerplant and providing lift, wherein
    (d) the duct includes at least one flight control surface adapted to affect rotation of the aircraft about at least one of the yaw and the pitch axes.

11. An aircraft according to claim 10 in which the duct contains elevator and rudder flight control surfaces.

12. An aircraft according to claim 10 in which the duct includes flight control surfaces which perform a combination of elevator and rudder functions.

13. An aircraft according to claim 10 in which the lifting surface includes elevators and aileron surfaces and the duct includes rudder surfaces.

14. An aircraft according to claim 11 in which one cockpit contains primary flight-controls and the other cockpit contains secondary flight controls.

15. An aircraft according to claim 10 in which the lifting surface contains combination flap and, aileron flight surfaces.

16. An aircraft according to claim 10 in which the power plant is reciprocating.

17. An aircraft according to claim 10 in which the power plant includes a turbojet.

18. A general aviation class aircraft adapted to take off and land on water, comprising:
(a) a pair of fuselages joined by a cantilevered lifting surface, each fuselage containing a cockpit and hydrodynamic fairing;
(b) a power plant mounted on a web supported by each of the fuselages, the power plant located adjacent to portions of the fuselages and connected to at least one of a propeller or fan;
(c) a generally tubular duct surrounding the power plant and structurally connecting the fuselages, for improving efficiency of the powerplant, adding structural integrity to the aircraft and providing lift, wherein
(d) the duct includes at least one flight control surface adapted to affect rotation of the aircraft about each of the yaw and the pitch axes.

* * * * *